Nov. 6, 1956

J. L. STRATTON 2,769,949

METHOD AND APPARATUS FOR MOTOR SPEED REGULATION

Filed March 23, 1954

2 Sheets-Sheet 1

Inventor
Jerry L. Stratton
by Howard I. Schlansker
His Attorney

Nov. 6, 1956  J. L. STRATTON  2,769,949
METHOD AND APPARATUS FOR MOTOR SPEED REGULATION
Filed March 23, 1954
2 Sheets-Sheet 2
Fig. 3.
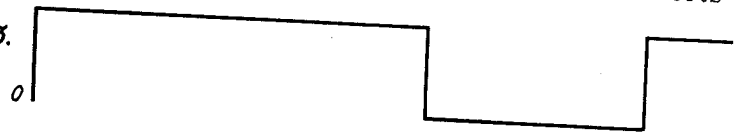
Fig. 4.
Fig. 5.
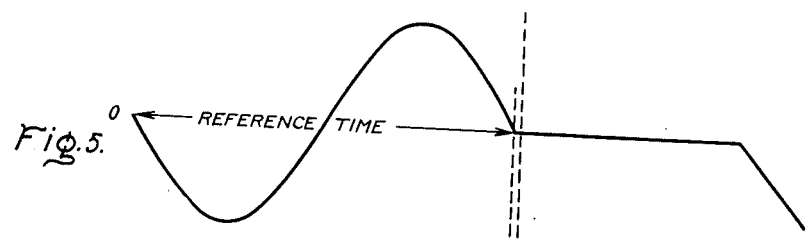
REFERENCE TIME
Fig. 6.
Fig. 7.
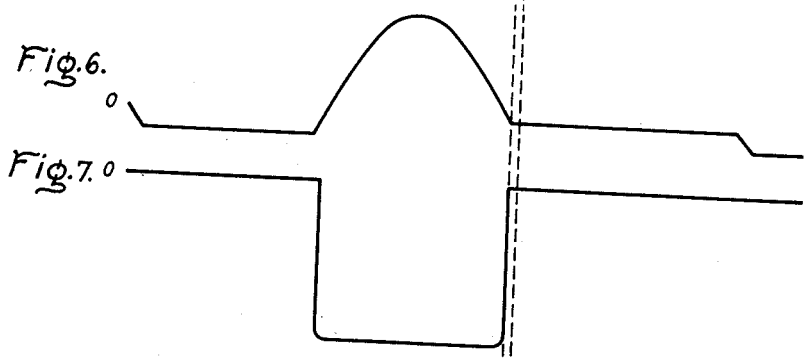
Fig. 8.
Fig. 9.
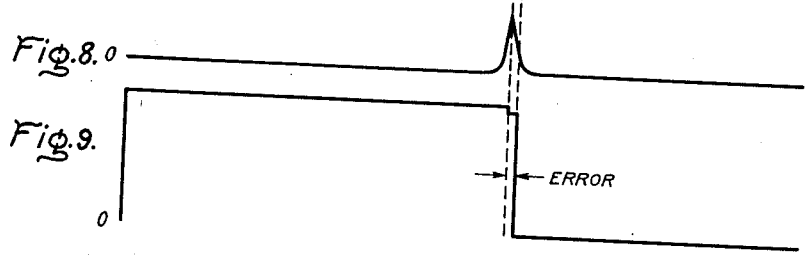
ERROR
Inventor
Jerry L. Stratton
by Howard D. Schlencker
His Attorney

United States Patent Office 2,769,949
Patented Nov. 6, 1956

2,769,949
METHOD AND APPARATUS FOR MOTOR SPEED REGULATION

Jerry L. Stratton, Schenectady, N. Y., assignor to General Electric Company, a corporation of New York Application March 23, 1954, Serial No. 418,111

5 Claims. (Cl. 318—312)

My invention relates to motor speed regulation. More particularly it relates to apparatus and methods for regulating the speed of D. C. motors.

The art of regulating the speed of electro-dynamic machines through the use of electronic oscillator systems is well-known. However, so far as is known when the oscillator systems now used drift out of synchronism, they do not return to that state without adjustment.

An object of my invention is to provide a motor speed regulating system which constantly maintains its synchronism.

Another object of my invention is to provide a motor speed regulating system which is characterized by high speed of response to variations in motor speed.

Briefly, according to my invention the motor speed regulating function is performed by comparing a time interval which is inversely proportional to the motor speed with a reference time interval, detecting and amplifying the error, if any, between the two time intervals and utilizing the error to vary the armature voltage of the motor and hence the motor speed to return the motor to its proper speed.

In accordance with a typical embodiment of my invention, the output of the D. C. motor whose speed is to be continuously regulated is used in part to drive an accurately apertured scanning disk. Light rays from a light source at one side of the rotating disk directed at a photoelectric pickup device on the opposite side of the disk are intermittently interrupted by the solid portions between the slots. The variation in light, specifically the interruption thereof, produces a voltage in the pickup which is amplified and applied to the plate of a thyratron tube. The reference time interval which is the period for one cycle of oscillation of an adjustable oscillating circuit is applied to the grid of the same thyratron type tube. There is then produced by this tube a D. C. current which is proportional to the difference or error between the reference time interval and that produced by the interruption of light through the scanning disk. This current is then utilized to vary the voltage to the motor armature.

Figure 1:
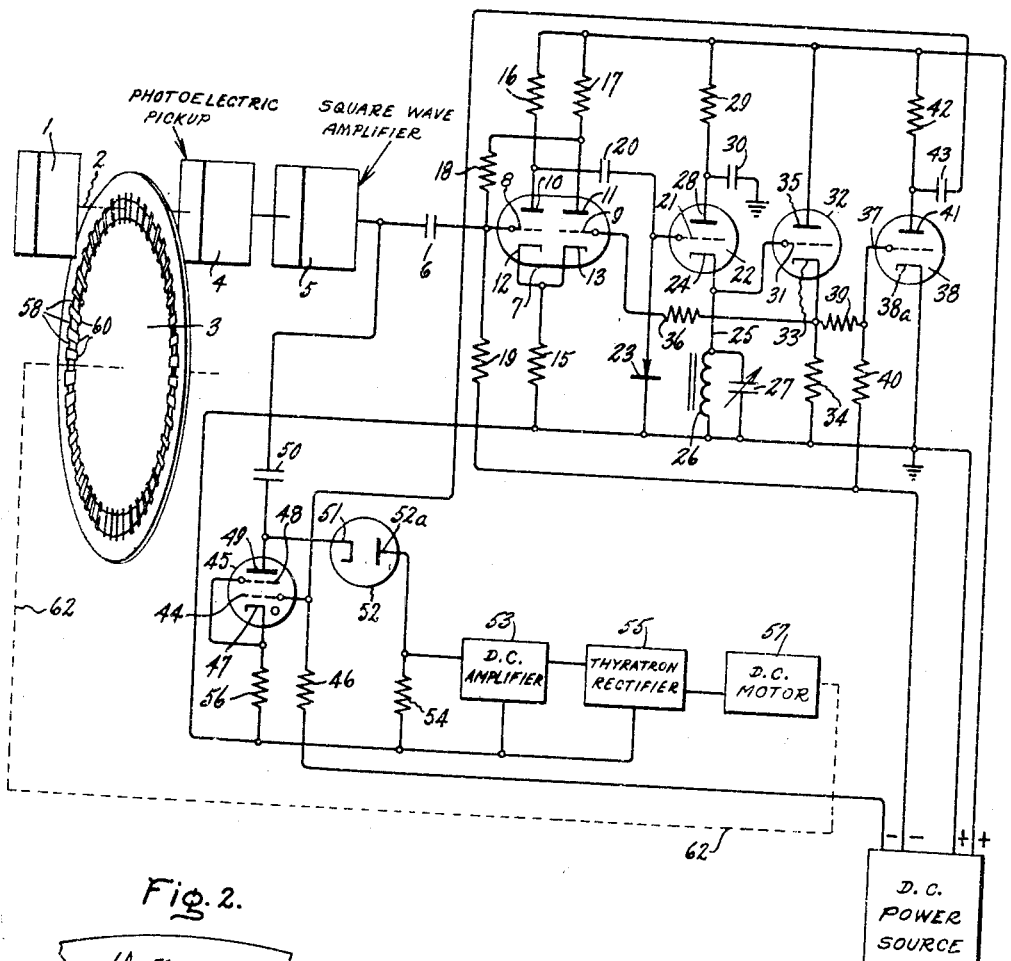
Figure 2:
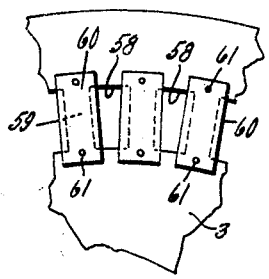

The features of my invention which I believe to be novel are set forth with particularity in the claims appended hereto. My invention itself, however, both as to its organization and method of operation, together with further objects and advantages thereof will be better understood by reference to the following description taken in connection with the drawing in which Fig. 1 shows the circuit of the preferred embodiment of my invention with conventional well-known parts shown in block form; Fig. 2 is a detailed view of a portion of the preferred type of scanning disk; and Figs. 3 through 9 show voltage wave shapes obtained at various points in the system.

Referring to Fig. 1, a constant light source 1 produces light ray 2 which is directed through the slotted portion of rotatable wheel 3. Light ray 2 when uninterrupted by the solid portion of wheel 3 is picked up by photoelectric pickup 4. The photoelectric pickup may be any of a number of those well-known in the art and preferably is of a high gain type. Connected in circuit with the photoelectric pickup is square wave amplifier 5 which again is any of a number of types well-known to those skilled in the art. Connected with square wave amplifier 5 as shown is capacitor 6 and amplifier tube 7 having grids 8 and 9, plates 10 and 11, and cathodes 12 and 13. The cathodes for all tubes used in my invention may be either directly or indirectly heated. Tube or valve 7 may typically be of the 6SN7 type or equivalent. In circuit with the cathodes 12 and 13, which are energized by means of D. C. source 14, is resistor 15. Power source 14 is also in circuit with plates 10 and 11 of tube 7 with resistors 16 and 17 connected as shown. Resistor 18 is connected between plate 11 and grid 8 of tube 7. Resistor 19 is in circuit between grid 8 and D. C. power source 14. Capacitor 20 is connected between plate 10 and grid 21 of tube 22 which latter is typically of the 6SL7 type. Rectifier 23 is connected between grid 21 and power source 14. Cathode 24 of tube 22 is connected to oscillatory tuned circuit 25 comprising inductance 26 and adjustable capacitor 27. This tuned circuit is also connected to the power source 14. Cathode 24 is also connected to grid 31 of cathode follower tube 32 which may be of the 6SN7 type or equivalent. Cathode 33 of this tube is connected to power source 14 through resistor 34, with plate 35 thereof also connected to the same source as shown. Cathode 33 is also connected to grid 9 of tube 7 through resistor 36 to provide a resetting function and with grid 37 of tube 38 through resistor 39. Tube 38 is typically a 6SL7 type. Cathode 38a is connected to the D. C. power source 14 and grounded as shown. Grid 37 is also connected to the same power source as shown through resistor 40 as is plate 41 of this tube, the latter through resistor 42. Plate 41 is also connected through capacitor 43 to grid 44 of tube 45 which is a thyratron type tube G. L. 2050 or equivalent. Grid 44 is also connected to power source 14 in the usual manner through resistor 46. The cathode 47 of tube 45 and grid 48 are connected as shown. Plate 49 is in circuit through capacitor 50 with square wave amplifier 5 and also with cathode 51 of tube 52 which latter is of the 6H6 type or equivalent. Plate 52a of tube 52 is in circuit with D. C. amplifier 53 and also through resistor 54 with D. C. amplifier 53 and rectifier 55 as shown. Rectifier 55 is normally of the well-known thyratron type. Also connected to D. C. amplifier 53 and rectifier 55 through resistor 56 is the cathode 47 of tube 45. The armature of D. C. motor 57 is energized by rectifier 55, the field being connected to a constant D. C. source not shown. As indicated by broken line 62, wheel 3 is driven by motor 57.

In order that the time intervals during which a voltage is generated in photoelectric pickup 4 by the interruption of light rays 2 may be exactly uniform, I prefer to use a specially constructed scanning wheel such as is shown in Fig. 2. Wheel 3 is shown in Fig. 2 as having cut-out portions near its periphery which define slots or spaces 58 separated by web portions 59. It is evident that it would be extremely difficult in cutting out a large number of spaces 58 in wheel 3 to make the width of all webs identical. Hence I prefer to adjustably fasten plates or pieces 60 of uniform width to the wheel as by screws 61 so that the solid or interrupting portion between the apertures will be exactly the same. Only in this or some equivalent fashion will the time intervals afforded by the rotating plate be exactly uniform. In a typical scanning wheel I provide any number of spaces and plates depending on the time interval and speed of response desired. For example, using 48 plates a like number of time intervals are provided for each revolution of the motor.

In operation, the D. C. motor speed is controlled or regulated by varying the motor armature voltage through the grid-controlled thyratron type tube 45. This is accomplished by comparing an interval of time which is inversely proportional to the motor speed with an accurate reference time interval. The inversely proportional time interval is produced by the interruption of light as it passes through the D. C. motor-driven scanning wheel while the reference time interval is one cycle of oscillation of a triggered oscillator circuit. A voltage spike produced by the oscillating circuit is applied to the grid of the thyratron type tube 45 while the photoelectric pickup voltage is applied to the plate of the same tube. The voltage spike fires tube 45 at the end of the reference time interval and a D. C. current proportional to the error between the two time intervals produced by deviation of the motor speed from its normal rate is used to regulate the motor speed.

In order more fully to understand the operation of my motor speed regulator let it be assumed that the D. C. motor is running at normal speed. When the light beams or rays 2 directed through scanning wheel 3 at photoelectric pickup 4 are interrupted, a voltage is produced in the pickup 4. The wave form of this voltage as amplified by square wave amplifier 5 is shown in Fig. 3, the positive portion of each cycle representing the time interval when the photoelectric pickup is not energized by light and the non-conducting portion corresponding to the period of time when the light is passed. The differentiating action of capacitor 6 produces a positive voltage spike when the voltage wave shape of Fig. 3 is positive or when light is not passing.

The amplified voltage output from the photoelectric pickup is applied to the grid of tube 22, the grid 21 being negative during light interruptions and positive during the period when light energizes the photoelectric pickup. Tube 22, inductance 26, and adjustable capacitor 27 form the so-called triggered oscillator with the triggering action being furnished by tube 12. When the grid 21 of tube 22 is negative, oscillations are produced in the tuned circuit comprising inductance 26 and capacitor 27, the length of time for one cycle of oscillation being utilized as the reference time interval. The electric constants for inductance 26 and adjustable capacitor 27 are selected so that the time of one cycle of oscillation is the same as the duration of light interruption by one spacer of the scanning wheel 3 when the D. C. motor is running at the desired or normal speed. The wave form produced at grid 21 is shown in Fig. 4, while the wave form produced in the tuned circuit is shown in Fig. 5. Tube 32 which functions as a cathode follower generates a voltage which has the wave form shown in Fig. 6. This voltage is applied to grid 9 of tube 7 and to the grid 37 of tube 38.

When the cathode 33 of tube 32 becomes positive a predetermined amount, the above-mentioned voltage applied to grid 9 of tube 7 resets the circuit in so-called "flip-flop" fashion. This action removes the negative voltage from the grid of tube 22. Current flow is not re-established in tube 22 until its cathode 24 returns to zero voltage at the end of the oscillation cycle.

The positive voltage applied to the grid 37 of tube 38 generates a voltage wave as shown in Fig. 7 at the plate of this tube. The differentiating action of capacitor 43 when applied to this voltage produces a positive voltage spike depicted in Fig. 8. This voltage spike in turn is applied to the grid 44 of tube 45.

During the above sequence of events, a portion of the positive voltage produced by square wave amplifier 5 is applied through capacitor 50 to the plate 49 of tube 45. The duration of this positive voltage is inversely proportional to the motor speed. The voltage spike applied to grid 44 of tube 45 fires this tube at the exact conclusion of the oscillation cycle or reference time interval as will be seen by comparing the position of the voltage spike in Fig. 8 with the end of the sine wave cycle in Fig. 5. In such case, it will be noted that the tip of the voltage spike or pulse occurs exactly at the end of the reference time.

When the time interval produced by the motor speed through scanning wheel 3 is different, for example, longer in duration than the reference time interval, the positive voltage spike is applied to the grid 44 of tube 45 while voltage at plate 49 is still positive. The wave shape at plate 49 of tube 45 when the motor speed time interval is longer than the reference time is shown in Fig. 9. Under such conditions a conduction period is produced in tube 45 which is a function of the speed error from that set in variable capacitor 27 which adjusts the oscillatory reference time interval. When tube 45 conducts, a D. C. current proportional to the error is produced through tube 52, resistor 54, amplified and used to vary the voltage of the armature of D. C. motor 57 to adjust its speed to that previously adjusted. Tube 52 serves to pass only D. C. current to resistor 54.

It will be seen that by my invention there is provided means for regulating the speed of a D. C. motor which is simple in structure and characterized by a high speed of response since the speed is adjusted, if necessary, after each cycle of the oscillating circuit.

While I have described my invention with respect to a certain preferred embodiment, I desire to protect by the appended claims all variations of the invention which do not depart from the spirit and scope thereof.

What I claim as new and desire to secure by Letters Patent of the United States is:

1. A speed regulating system for a D. C. motor comprising an intermittently slotted scanning disk adapted to be driven by said motor, a light source adapted to pass light rays through the slots in said scanning disk, a photoelectric pickup device positioned to receive light rays from said light source through said slots and adapted to generate a voltage when said light rays are interrupted, means to amplify said voltage, an oscillating circuit adapted to be energized by said voltage, differentiating means to provide a voltage spike at the end of each cycle of said oscillating circuit, means to apply said voltage spike to the grid of a thyratron type tube, means to apply the amplified voltage from the photoelectric pickup to the plate of said thyratron type tube whereby when the motor varies from its normal speed a differential current is produced in said thyratron tube, and means to utilize said differential current to control the voltage in the armature of said motor and return its speed to normal.

2. A speed regulating system for a D. C. motor comprising a scanning wheel adapted to be driven by said motor, said wheel having a plurality of apertures in the periphery thereof, said apertures being separated by a plurality of spacers of the same width, a photoelectric pickup adapted to receive light rays from a light source through said apertures and to generate a voltage when said light rays are interrupted, means to apply said voltage to an adjustable oscillating circuit, the time of each cycle of which is adjusted to equal the time of interruption of light rays through said scanning wheel by one of said wheel spacers at normal motor speed, means to apply a voltage spike at the end of each oscillatory cycle to the grid of a thyratron type tube and means to apply said voltage to the plate of said thyratron tube whereby when the motor speed varies from normal, a current proportionate to the variation in motor speed is produced by said thyratron tube and means to utilize said current to vary the voltage in the armature of said motor to be adjusted to normal speed.

3. A speed regulating system for a D. C. motor comprising a scanning wheel having apertures therein and adapted to be driven by said motor, a photoelectric pickup adapted to receive light rays through said apertures from a light source, said photoelectric pickup being adapted to generate a voltage when said light rays are interrupted, means to amplify and apply said voltage to an adjustable oscillating circuit whose cycle is adjusted to equal in time each light interruption at normal motor speed, means to apply a voltage spike at the end of each oscillating cycle to the grid of a thyratron type tube, means to apply the amplified voltage from said photoelectric pickup to the plate of said thyratron type tube whereby when the motor varies from its normal speed a current is produced in said thyratron type tube and means to utilize said current to control the armature voltage of said motor and hence its speed.

4. A speed regulating system for a D. C. motor comprising means to generate a time interval related to actual motor speed comprising a scanning wheel adapted to be driven by said motor and having a plurality of slots in the periphery thereof, said slots being separated by spacers of equal width, a photoelectric pickup adapted to receive light rays through said slots from a light source at the opposite side thereof and to generate a voltage when said light rays are interrupted by said spacers, means to amplify and apply said voltage to an oscillating circuit whose period is adjusted to equal in time that of each light interruption at normal motor speed, means to apply a voltage spike at the end of each oscillatory cycle and to apply the amplifier voltage from said photoelectric pickup to an electronic tube whereby when the motor speed varies from normal a current is produced therein and means to vary by means of said current the armature voltage of said motor to return it to normal speed.

5. A speed regulating system for a D. C. motor comprising means to generate a series of voltage pulses, each of said voltage pulses having a duration related to the actual motor speed, means to generate a reference voltage pulse in response to and at the instant of initiation of each one of said voltage pulses, each of said reference voltage pulses having a time duration dependent on the desired motor speed and means to utilize the difference in time duration between each of said reference voltage pulses and the corresponding voltage pulse to adjust the motor speed to the desired value.

References Cited in the file of this patent

UNITED STATES PATENTS

| | | |
|---|---|---|
| 2,281,954 | Rinia | May 5, 1942 |
| 2,492,045 | Jacubowitz | Dec. 20, 1949 |
| 2,509,730 | Dome | May 30, 1950 |
| 2,576,760 | Jones et al. | Nov. 27, 1951 |